May 12, 1959

F. WOHLMAN, JR 2,885,849

SEMICONDUCTOR TAPING APPARATUS

Filed Feb. 28, 1957

4 Sheets-Sheet 1

FRED WOHLMAN, JR.
INVENTOR

BY Edw A. Olsen

AGENT

May 12, 1959 F. WOHLMAN, JR 2,885,849

SEMICONDUCTOR TAPING APPARATUS

Filed Feb. 28, 1957 4 Sheets-Sheet 2

FRED WOHLMAN, JR.
INVENTOR

BY [signature]

AGENT

May 12, 1959 F. WOHLMAN, JR 2,885,849

SEMICONDUCTOR TAPING APPARATUS

Filed Feb. 28, 1957 4 Sheets-Sheet 3

FRED WOHLMAN, JR.
INVENTOR

BY Edwin A. Oser

AGENT

FRED WOHLMAN, JR.
INVENTOR

BY Edw. A. Ows.

AGENT 2,885,849

SEMICONDUCTOR TAPING APPARATUS

Fred Wohlman, Jr., Inglewood, Calif., assignor to Hughes Aircraft Company, Culver City, Calif., a corporation of Delaware Application February 28, 1957, Serial No. 643,108

1 Claim. (Cl. 53—198)

This invention relates to an apparatus for disposing semiconductor translating devices or similar structures in spaced positions on strips of pressure sensitive material and for thereafter packaging such devices for shipment.

In the manufacture of semiconductor translating devices such as, for example, transistors, diodes, rectifiers, photocell devices and the like, it has been the general practice manually to place such devices in cartons containing a prescribed number and to dispose leads therefrom in suitable notches provided in cardboard separators in the boxes. This arrangement enables shipment of these delicate devices and retains them in spaced relationship for ready access or use thereof. However, no means has been provided for securing devices of this character to the cardboard separators or for insuring at least semi-permanent orientation thereof. While this prior method of packaging is adequate in many instances, considerable time is required manually to place the devices in the package and the linear nature of the package pattern requires considerable packaging space, added shipping weight and volume, requires excessive time for removal from the packages during use and necessitates prechecking to determine proper orientation before use thereof.

It is, accordingly, one important object of the present invention to provide a novel apparatus for packaging semi-conductor translating devices or like similar structures.

It is another important object of the invention to provide a taping apparatus for semiconductor translating devices whereby to package such devices in relatively small volume, low weight containers commensurate with the numbers of such devices so packaged.

It is a further important object of the invention to provide a semiconductor taping apparatus that is rapid and efficient in operation, reliable in use and which may be utilized by relatively unskilled operators.

It is still another important object of the invention to provide a novel semiconductor taping apparatus wherein means are provided to dispose semiconductor translating devices or like structures in spaced relationship along strips of pressure sensitive tape and for thereafter disposing the taped devices on a reel.

A still further important object of the invention is to provide a taping apparatus for semiconductor translating devices, or like structures, wherein means are provided for insuring lateral alignment of pressure sensitive surfaces of tape employed therewith, thereby to prevent adhesion between adjacently disposed strips of taped devices.

Other and further important objects of the invention will become apparent from the disclosures in the following detailed specification, appended claims and accompanying drawings, wherein:

Figure 1:
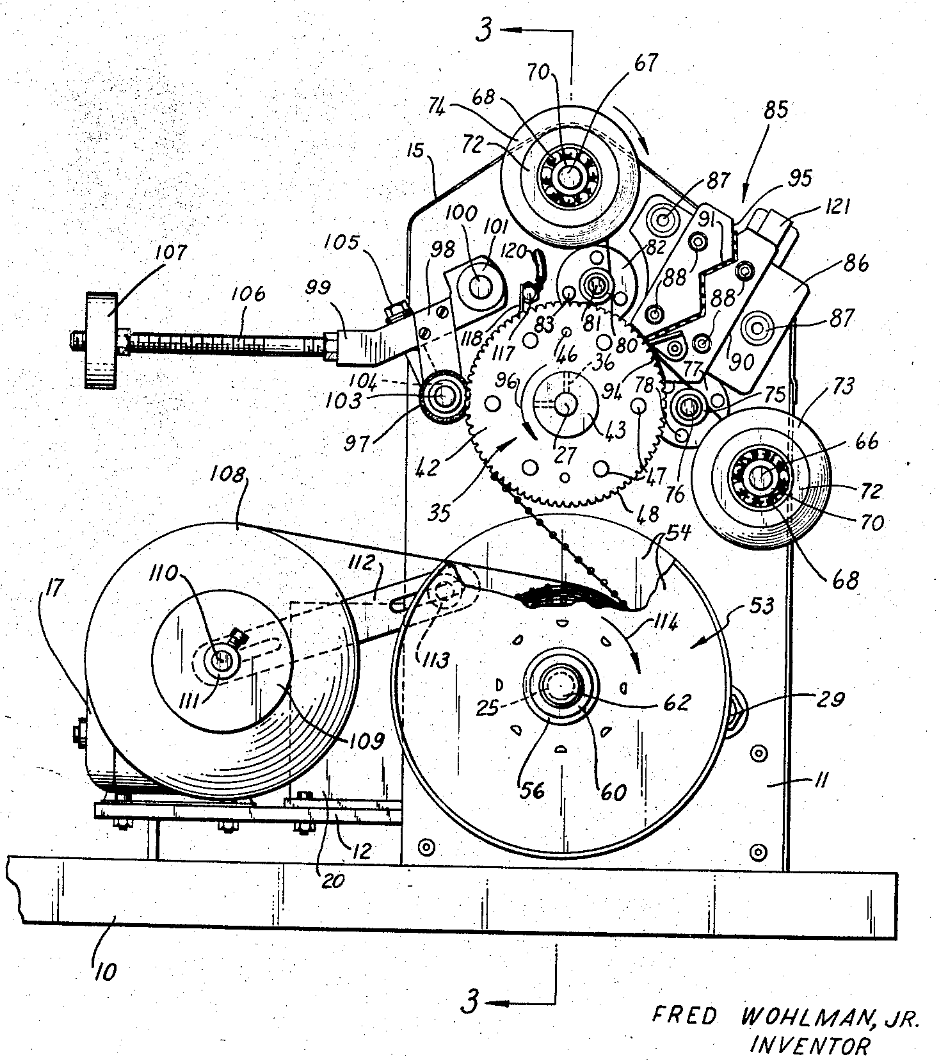
Figure 1 is a front elevational view of the present taping apparatus with portions broken away for clarity.

With reference to the drawings, the taping apparatus hereof is provided with a base 10 from which the balance of the apparatus extends. A backing plate 11 is vertically disposed from the base, there being a subbase structure 12 secured to one side of the backing plate 11 adjacent the base 10. A rear plate 13 is also disposed from the base 10 and secured to the subbase 12, with the backing plate 11 and rear plate 12 forming ends of an enclosure 14 over which outer paneling 15 is disposed. The paneling 15 is secured to the plates 11 and 13 by means of screws 16. The backing plate 11 and rear plate 13 serve to support the mechanism hereof.

Figure 3:
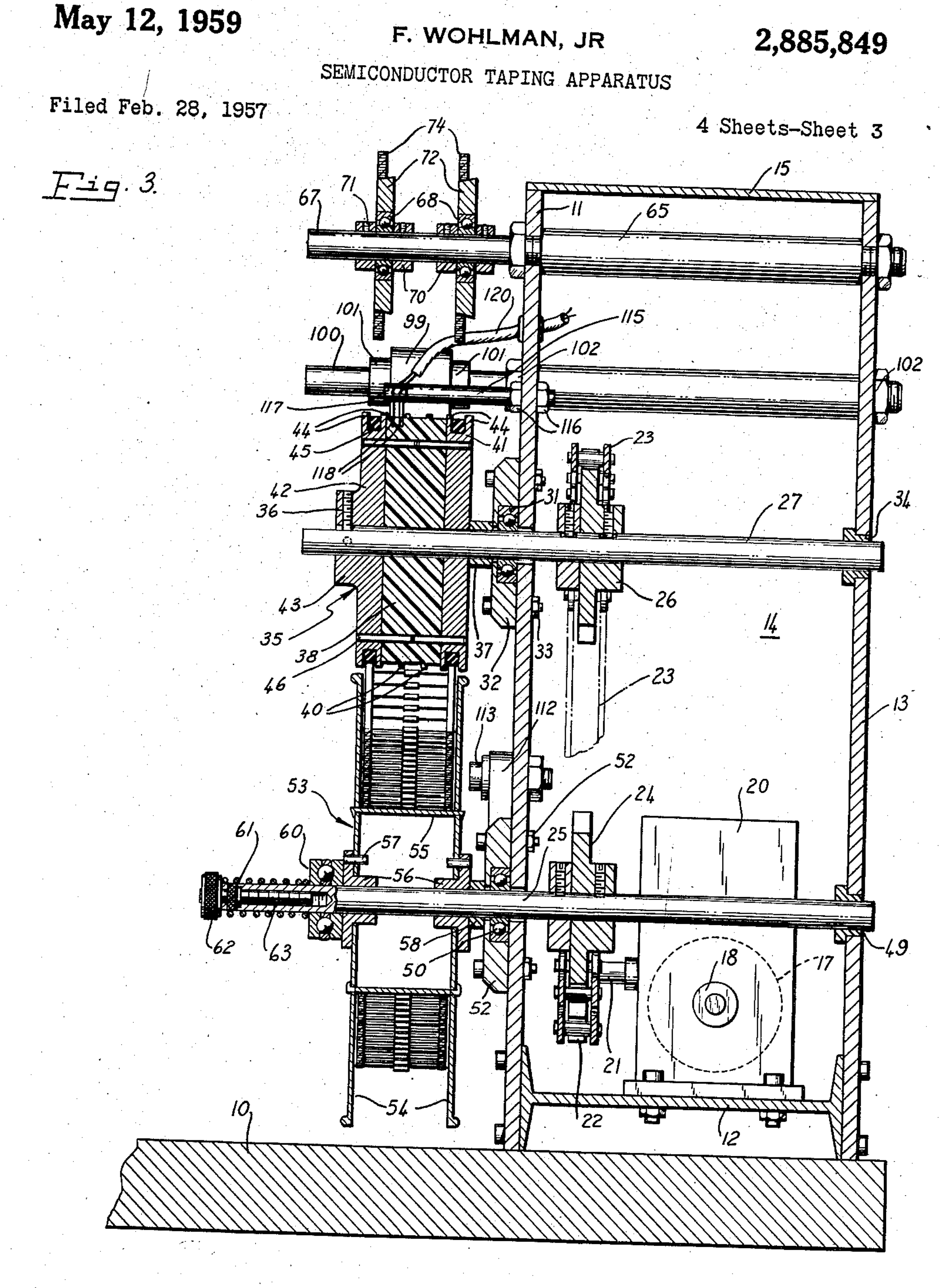
Fig. 3 is an enlarged vertical sectional view taken substantially as indicated by line 3—3, Fig. 1.
Figure 4:
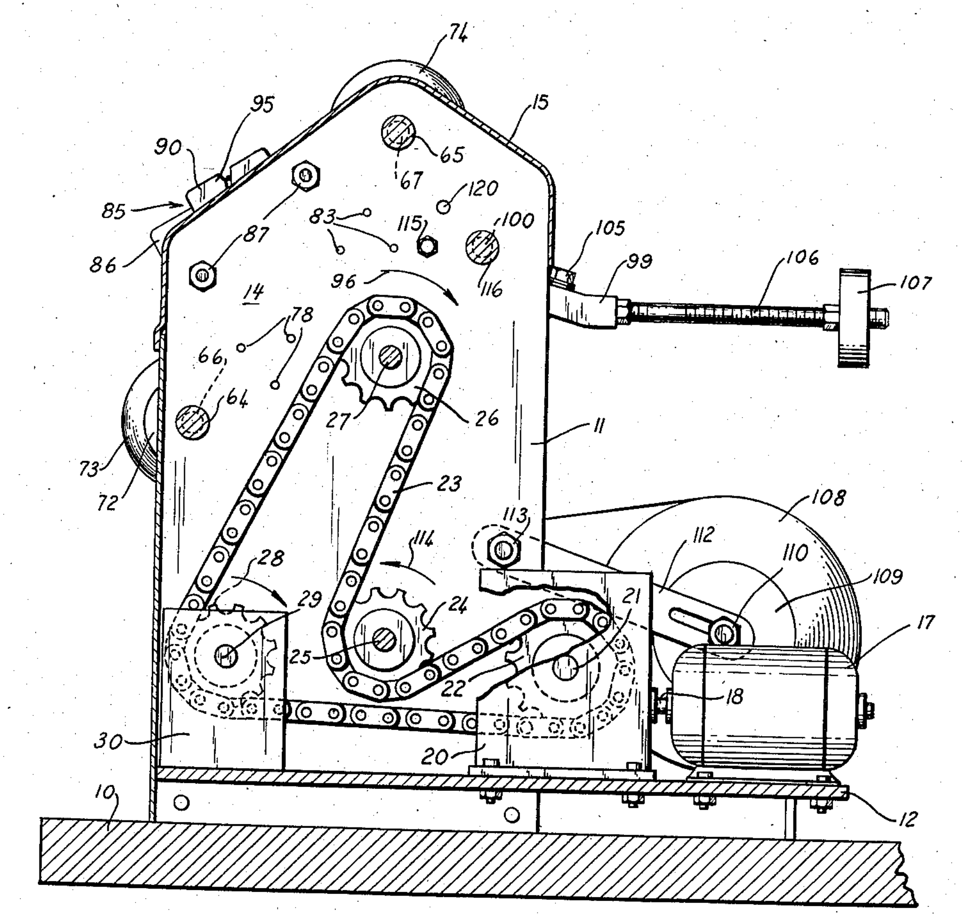
Fig. 4 is a rear elevational view of the apparatus showing the driving mechanism therefor.

With reference primarily to Figs. 3 and 4, the enclosure 14 is adapted to house the driving mechanism of the present apparatus which includes a motor 17 having an output shaft 18. The motor 17 is mounted on the subbase 12 with the output shaft 18 extending to a right angle gear box 20 having an output shaft 21. The shaft 21 has a sprocket 22 mounted thereon and over which a chain 23 extends. The chain 23 is adapted to extend about a sprocket 24 carried by a shaft 25, a sprocket 26 carried by a shaft 27 and a sprocket 28 carried by a shaft 29 thus to drive each of these shafts. As seen in Fig. 4, the sprockets 26 and 28 are driven in a clockwise direction, while the sprocket 24 is driven in a counterclockwise direction. The sprocket 28 serves merely as an idler, with the shaft 29 being rotatably disposed between the backing plate 11 and an outboard supporting plate 30 that is in turn secured to the subbase 12.

The shaft 27 is journalled in a roller bearing 31 that is carried by a bearing block 32 that is in turn mounted on the backing plate 11 and secured thereto by means of bolts 33. The shaft 27 is further journalled in a sleeve bearing 34 in the rear plate 13 and has an outer end that extends outwardly from the outer face of the backing plate 11. A drum, indicated generally at 35, is mounted on the outer end portion of the shaft 27 and secured thereto by means of suitable set screws 36 which engage a flattened area on the shaft. A spacer 37 is disposed between an inner surface of the drum 35 and an outer surface of the bearing block 32.

As shown primarily in Figs. 1 and 3, the drum 35 comprises a central core 38 made from a phenolic material or the like and having a pair of spaced annular ribs 40 about the periphery thereof, thus to divide the outer surface of the core into three substantially equal axially extending segments. The drum 35 further includes a rear face member 41 and a forward face member 42, the face member 42 having a boss 43 formed therefrom and through which the set screws 36 extend. The peripheral edges of the plate members 41 and 42 are each provided with spaced ribs 44 which define annular grooves in which resilient rings 45 of rubber or the like are positioned. The rings 45 may be of any other suitable resilient material for a purpose to be hereinafter more fully described. The various components of the drum 35 are maintained in alignment by means of axially extending pins 46 disposed in suitable aligned bores in the face members 41 and 42 and in the core 38. Additionally, a plurality of bolts 47 secure the face members to the core. The ribs 44 and the ribs 40 are each provided with radially extending, axially aligned, spaced V-shaped notches 48 also for a purpose to be hereinafter more fully described.

Figure 2:
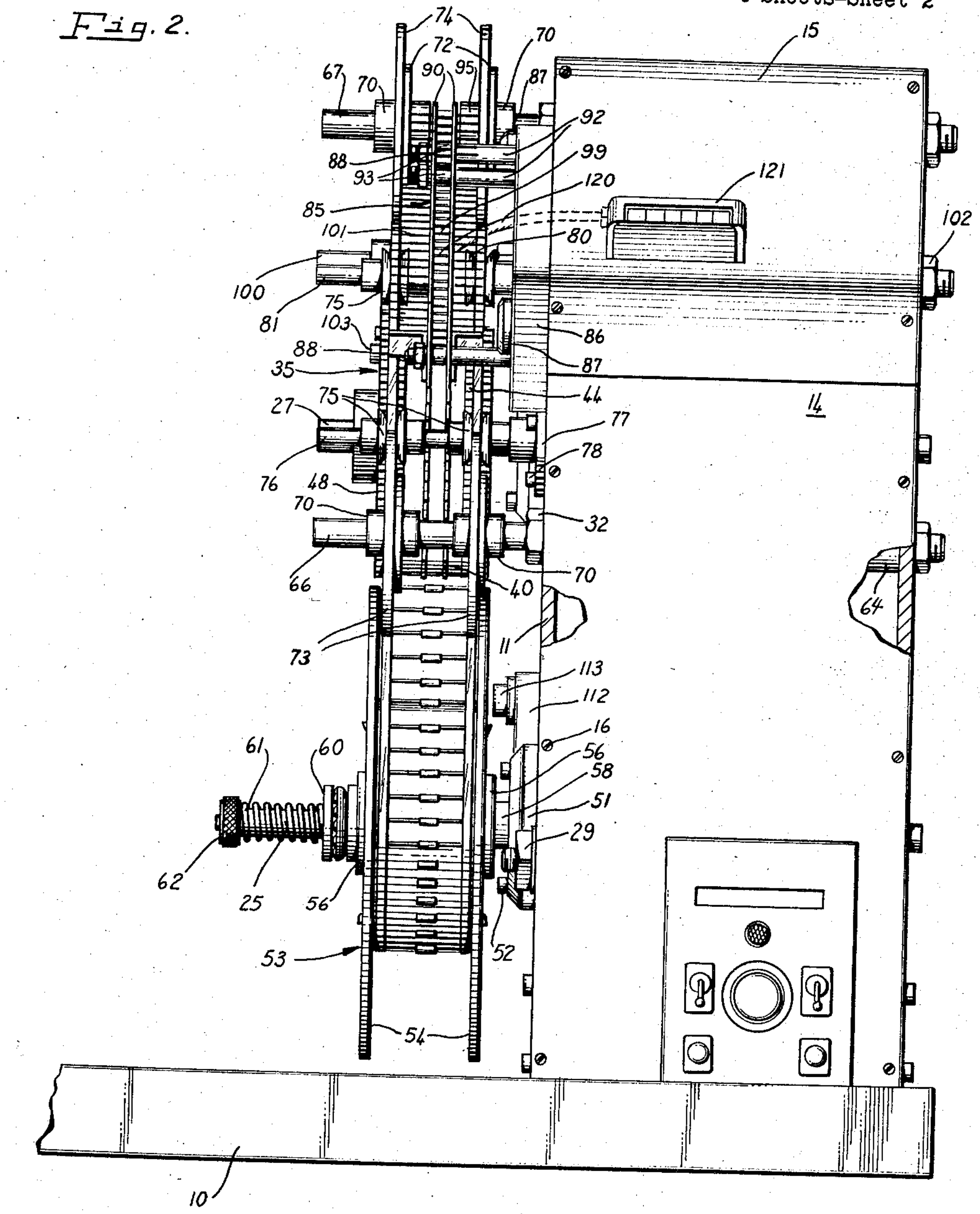
Fig. 2 is an enlarged side elevational view of the apparatus.

As shown primarily in Figs. 1, 2 and 3, the shaft 25 extends outwardly from the forward face of the backing plate 11, across the enclosure 14, is journalled in a sleeve bearing 49 in the rear plate 13 and in a suitable roller bearing 50 carried by a bearing block 51. The block 51 is secured to the backing plate 11 by means of suitable bolts 52. A reel indicated generally at 53 is rotatably mounted on the shaft 25. The reel consists of side plate members 54 that are secured to lateral ends of a hub 55. End plates 56 are disposed about the shaft 25, have reduced diameter portions disposed in central openings in the side plate members 54, are adapted to bear against outer surfaces of the side plates and are keyed to these side plates by means of pins 57 that are carried by the members 56 and extend into suitable openings in the plates 54. A spacer 58 is disposed between one of the members 56 and an outer surface of the bearing block 51. As shown primarily in Fig. 3, a thrust bearing 60 is disposed about the shaft 25 adjacent an outer end thereof, one race being adapted to bear against an outer surface of one of the end plate members 56, the other surface engaging one end of a compression spring 61. The other end of the compression spring 61 is adapted to bear against a head 62 of a screw 63 that threadably engages axially in the outer end of the shaft 25. The outer race of the thrust bearing 60 is mounted in tight engagement with the shaft 25 and upon rotation of the shaft 25 through the sprocket 24, the reel 53 will be rotated, force being transmitted thereto from the shaft 25, through the spring 61 and the thrust bearing 60.

As shown primarily in Figs. 1, 2 and 3, a pair of shafts 64 and 65 have enlarged diameter portions disposed between the plates 11 and 13, the shafts being secured thereto by means of nuts bearing against outer surfaces of the plates. The shafts 64 and 65 have reduced diameter end portions 66 and 67 respectively which extend outwardly from the outer face of the plate 11. Each of the shaft portions 66 and 67 is adapted to support spaced roller bearings 68 that are retained in fixed axial positions on the shaft portions by means of collars 70 having set screws 71. The outer peripheries of the bearings 68 are adapted to carry hubs 72 that in turn each support rolls of relatively narrow pressure sensitive tape material, the tape rolls associated with the shaft portion 66 being indicated at 73, the tape rolls associated with the shaft portion 67 being indicated at 74.

Tapes from the rolls 73 are adapted to extend therefrom over a pair of guide rollers 75 rotatably mounted on a stub shaft 76 that is in turn disposed outwardly from a mounting plate 77. The mounting plate 77 is attached to the backing plate 11 by means of bolts 78. The tapes from the rolls 74 extend therefrom and over a pair of guide rollers 80 that are rotatably mounted on a stub shaft 81 that is disposed outwardly from a mounting plate 82 also secured to the backing plate 11 by means of bolts 83. The rollers 75 and 80 are arranged adjacent the periphery of the drum 35 and, along with the rolls of tape material 73 and 74, are in radial alignment with the grooves formed between the ribs 44 on the drum. The circumferential spacing of the rollers 75 and 80 relative to the drum 35 serves to define delivery stations for the tape material being fed to the drum. It is to be noted that the rear surfaces of the tape from the rolls 73 and 74 contact the rollers 75 and 80 respectively and disposition about the drum 35 is in a direction whereby the adhesive surfaces of the tapes from the rolls 73 and 74 face each other. The guide rollers 75 and 80 serve further to insure alignment of the tape strips in order that no exposed adhesive will be presented.

In order that the translating devices to be taped hereby may be disposed in position along the adhesive surfaces of the tapes from the rolls 73, a dispensing mechanism indicated generally at 85 is provided. This mechanism includes a mounting block 86 that is secured to the backing plate 11 by means of bolts 87. A plurality of studs 88 are disposed outwardly from the block 86 to support identical spaced blades 90 each composed of a pair of blade members having a Z-shaped space 91 therebetween. A lower end of the space 91 is disposed closely adjacent to a peripheral surface of the drum 35, ends of the blades 90 overlying central areas of the ribs 40. Spacers 92 are disposed about the studs 88 and extend between one of the blades 90 and the outer surface of the block 86. Additional spacers 93 are also disposed about the studs 88 and intermediate the blades 90. A guide member 94 is carried by each of the blades 90 and positioned adjacent a lowermost end of the Z-shaped space 91. Thus, translating devices are manually disposed in a receiving notch 95 at an upper end of the space 91 to position such devices laterally between the blades 90 while permitting the laterally disposed leads thereof to extend through and outwardly from the spaces 91 in each of the blades 90. The Z-shaped nature of the space 91 serves to insure travel of the devices downwardly therethrough for disposition in each of the V-shaped notches 48 in the periphery of the drum 35, with outer ends of the leads of the translating devices being guides by the members 94 for disposition in contact with the adhesive sides of the tapes from the rolls 73 that are disposed in the grooves between ribs 44 on the drum 35. By providing the Z-shaped spaces 91, rather than a straight guiding path, the weight of the devices extending to the drum 35 is effectively removed from the lowermost of the devices adjacent the periphery of the drum. As the drum 35 rotates in the direction of an arrow 96, the tapes from the rolls 74 will be disposed on outer surfaces of the leads of the translating devices whereby to confine these leads between two inwardly facing pairs of tape strips.

In order to insure positive contact of the tape strips with the leads of the translating devices, a pair of pressure rollers 97, having resilient outer surfaces and disposed in radial alignment with the grooves defined between the ribs 44, are positioned to engage outer surfaces of the tapes from the rolls 74. The rollers 97 are carried by brackets 98 that are disposed downwardly from an arm 99 that is in turn pivotally supported on a shaft 100, and maintained in position by means of collars 101 disposed about the shaft 100 on lateral sides of the arm 99. The shaft 100 extends laterally across the enclosure 14 and is secured to the plates 11 and 13 by means of suitable nuts 102. The rollers 97 are secured to a shaft 103 that is disposed in slots 104 in the brackets 98. The position of the shaft 103 in the slots 104 is determined by means of an adjustable screw 105 carried by the arm 99 and connected with the shaft 103. The outer end of the arm 99 has a rod 106 coextensively connected thereto, the end of which threadably supports a weight 107. It may thus be seen that the effect of the weight 107 serves to force the pressure rollers 97 into tight contact with the outer surfaces of the tapes from the rolls 74, whereby to cooperate with the rubber rings 45, conform about the leads and insure positive engagement of the adhesive surfaces of the tapes from the rolls 73 and 74 and tight confinement of the leads of the translating devices therebetween.

The thus taped translating devices extend in belt form from the drum 35 and onto the reel 53 to be wound thereon. As the taped translating devices are wound upon the reel 53, a layer of paper from a roll 108 is disposed therebetween. The paper roll 108 is carried by a hub 109 that is rotatably supported on a shaft 110 and retained thereon by means of a collar 111. The shaft 110 is carried by an arm 112 that is in turn adjustably secured to the backing plate 11 by means of a nut 113. Both the shaft 110 and the nut 113 are disposed in slotted ends of the arm 112, whereby to permit the adjustable positioning of the roll of paper 108.

As described hereinbefore, the reel 53 is driven by means of the sprocket 24 and through the thrust bearing 60 in a direction indicated by the arrow 114. A differential drive of the reel 53 is accomplished by providing for driving thereof at a speed commensurate with that necessary when the taped devices are being wound adjacent the hub 55 of the reel. As the taped devices approach the outer periphery of the reel 53, a lower driving speed for the reel is required and slippage is provided through the thrust bearing 60. When the reel 53 has been filled, this reel is removed by removing the screw 63, thrust bearing 60 and one of the plate members 56, and a new empty reel is placed in its position for reception thereafter of the taped translating devices and interdisposed paper from the roll 108. The previously filled reel is then ready for shipment.

As shown primarily in Figs. 1 and 3, a stud 115 is disposed adjacent the periphery of the drum 35, secured to the backing plate 11 by means of nuts 116 and extends outwardly therefrom. The outer end of the stud 115 has an insulated tip 117 attached thereto, there being a pair of contact blades 118 disposed downwardly therefrom. The contact blades 118 are adapted to overlie the outermost of the grooves in the drum 35 between one of the ribs 40 and one of the ribs 44, and to be engaged by one of the leads of each of the translating devices as they are moved past the blades. The blades 118 are electrically connected, by means of wires 120, with a counter mechanism 121 mounted on the outer surface of the paneling 15, whereby to provide an indication of the number of devices passing through the taping apparatus. Contact of the blades 118 with only one of the leads of the translating devices has no effect upon the translating devices.

It may thus be seen that semiconductor translating devices or similar structures may be rapidly, efficiently and simply disposed between strips of pressure sensitive tape and thereafter packaged on reels for shipment to the customer and for efficient and effective use thereof. The device may be dispensed directly from the reel and fed into automatic machinery having facilities for trimming the leads inwardly from the tape strips, thus effectively separating the devices from these strips. The efficient and rapid operation of the present apparatus is coupled with the light weight and compact nature of the ultimate package, whereby to provide for over-all efficiencies in connection with initial packaging, shipping and ultimate use of the devices.

Having thus described the invention and the present embodiment thereof, it is desired to emphasize the fact that many modifications may be resorted to in a manner limited only by a just interpretation of the following claim.

I claim:

An apparatus for packaging articles having laterally disposed extensions comprising, in combination: a supporting frame structure; a drum carried by said structure; a plurality of circumferentially disposed laterally spaced ribs on a peripheral surface of said drum; laterally disposed circumferentially spaced notches in said ribs; means for rotatably driving said drum; shaft and bearing means carried by said structure for rotatably supporting two pairs of rolls of strip material; guide roller means for feeding said material from said rolls between said ribs on said drum and at delivery stations spaced circumferentially about said drum; chute means for gravitationally feeding said articles for delivery to a peripheral surface of said drum at a point intermediate said delivery stations whereby, upon rotation of said drum, to dispose said extensions at each end of said articles between two strips of said material for retention of said extensions therebetween; a pair of pressure rollers disposed from said structure; weight means associated with said rollers for urging said rollers into engagement with said strips of material overlying said drum; a packaging reel carried by said structure, said strips of material and said articles retained thereby being conducted from said drum for disposition about said reel; thrust bearing means for rotatably driving said reel; and a paper roll supporting structure, material therefrom being adapted for disposition between wound layers of strips and said articles on said reel.

References Cited in the file of this patent

UNITED STATES PATENTS

| | | |
|---|---|---|
| 2,395,125 | Kile | Feb. 19, 1946 |
| 2,468,517 | Salfisberg | Apr. 26, 1949 |
| 2,541,387 | Salfisberg | Feb. 13, 1951 |
| 2,668,405 | Droll | Feb. 9, 1954 |
| 2,771,206 | Daniels et al. | Nov. 20, 1956 |